Sept. 23, 1969          L. W. PARTRIDGE            3,469,115
           CARDIAC WAVEFORM SIMULATING APPARATUS
Filed May 10, 1967                              2 Sheets-Sheet 1
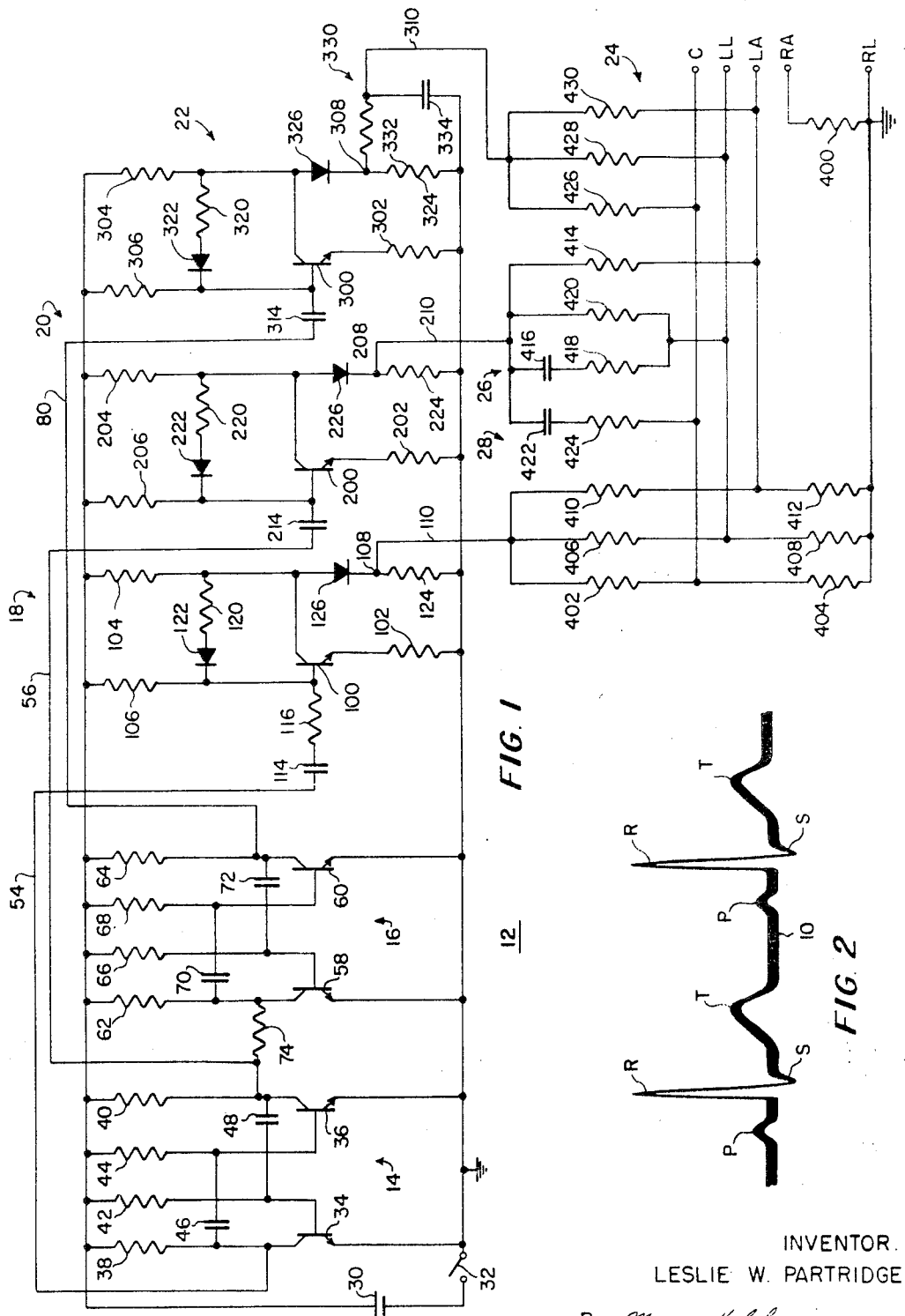
INVENTOR.
LESLIE W. PARTRIDGE
By Mason, Kolehmainen
   Rathburn & Wyss Sept. 23, 1969    L. W. PARTRIDGE    3,469,115
CARDIAC WAVEFORM SIMULATING APPARATUS
Filed May 10, 1967    2 Sheets-Sheet 2
FIG. 3 { MAIN MULTI-VIBRATOR
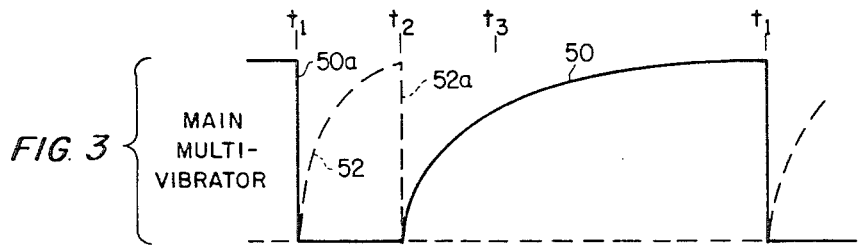
FIG. 4 { CONTROLLED MULTIVIBRATOR
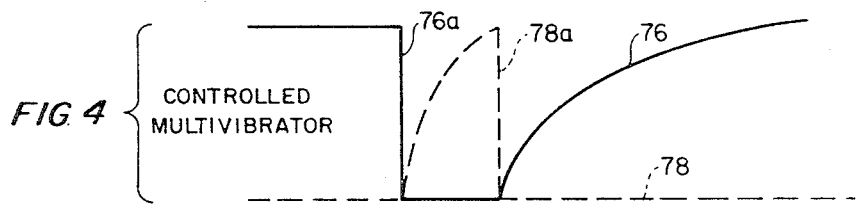
FIG. 5 { P WAVE
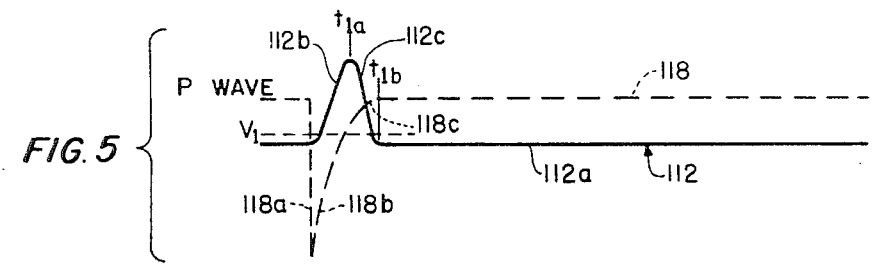
FIG. 6 { R WAVE
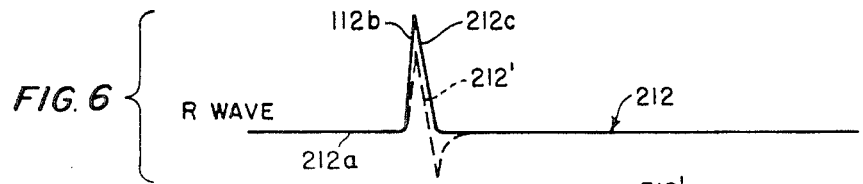
FIG. 7 { T WAVE
FIG. 8 { RA-LL OUTPUT
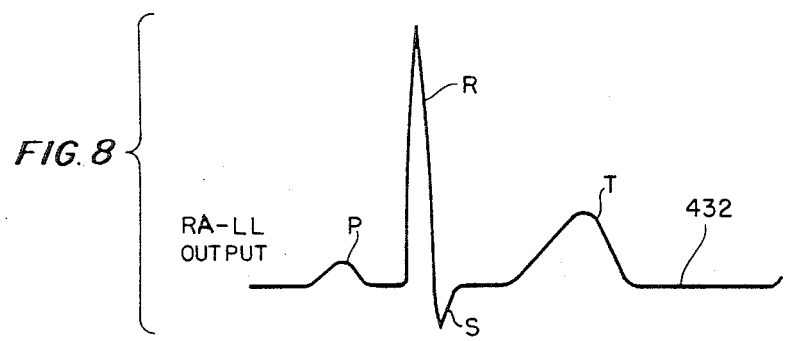
INVENTOR.
LESLIE W. PARTRIDGE
By Mason, Kolehmainen,
Rathburn, & Wyss United States Patent Office 3,469,115
Patented Sept. 23, 1969

3,469,115
CARDIAC WAVEFORM SIMULATING APPARATUS
Leslie W. Partridge, Janesville, Wis., assignor to The Burdick Corporation, Milton, Wis., a corporation of Delaware
Filed May 10, 1967, Ser. No. 637,383
Int. Cl. H03k 5/01
U.S. Cl. 307—268                              13 Claims

ABSTRACT OF THE DISCLOSURE

A cardiac waveform simulator includes main and synchronized astable multivibrators producing timed, sequential negative-going signals capacitively coupled to three normally conductive transistors associated with P, R and T wave generators. Upon being rendered nonconductive by a negative-going signal, a resistive charging circuit returns the transistor to a threshold conduction level and then to the original conduction level. A diode and resistive branch ties the output terminal to the capacitor so that the leading edge of a triangular pulse is produced while the transistor is being returned to its threshold conduction level. Upon being rendered increasingly conductive, the transistor produces the trailing edge of the triangular pulse. A differentiating network produces an S pulse following each R pulse, and an integrating network smooths the T pulse. A mixer circuit combines the pulses to apply a cardiac wave form complex to five output terminals.

---

The present invention relates to voltage generating apparatus for providing a simulated cardiac waveform for operating an electrocardiograph or the like.

Many devices such as electrocardiographs, heart monitors, etc., have been developed for displaying and/or analyzing electrical signals induced by cardiac action. For testing and demonstrating such devices, it is desirable for various reasons to use a standardized and conveniently available simulated cardiac waveform rather than relying upon a human subject. Known units for producing such waveforms have been of the electronic type or of the electromagnetic type, and have been subject to various disadvantages.

Electronic cardiac wave simulators known heretofore use periodic waves such as square waves for providing the timing of the cardiac waveform, and for energizing filter networks intended to produce the various pulse or wave components of a cardiac waveform. The square waves, which may be generated by transistor multivibrator circuits, are applied to filters including resistive and capacitive components for forming the discrete pulses or waves of the cardiac wave form. However, such filters produce a wave which has a faster rise time than fall time, and which has a curved trailing edge caused by exponential decay. Since a human cardiac wave, such as a P, R or T wave, has a generally triangular shape, and has a rise time equal to or somewhat longer than the fall time, known electronic devices are incapable of achieving an accurate approximation of the waveforms induced by cardiac action of a human heart.

Another approach to cardiac wave simulation is the use of an electromagnetic device such as that disclosed in U.S. Patent 2,834,898 granted to Leslie W. Partridge. That device includes a pickup coil assembly disposed adjacent a moving magnetic structure. Voltages approximating a cardiac waveform are induced by the moving magnetic field upon movement of the magnetic structure. Although this device has been highly satisfactory for its intended uses, it is subject to some disadvantages including the lack of a flat base line, particularly between the R and T waves, size, high power consumption and expense, and the noise and AC interference resulting from the use of a drive motor.

The present invention provides an improved cardiac wave simulating device of compact, simple and inexpensive construction. The device provides an output which approximates very closely the waveform complex induced by cardiac action of a normal human heart. In addition, the device has low power and voltage requirements, can be operated in any position, is silent in operation, and provides no AC interference. Furthermore the cardiac waveform produced is characterized by a flat base line between the individual cardiac pulses or waves. Thus an accurate check of the low frequency time constant and the friction or hysteresis of electrocardiograph amplifying and recording equipment is possible.

In brief, a cardiac wave simulating device constructed in accordance with the invention may comprise a main multi-vibrator for establishing the rate of the cardiac waveform, together with a controlled multivibrator synchronized with the main multivibrator. A series of pulse or wave generating circuits are controlled by the multivibrators to produce the P, R and T pulse components of the cardiac waveform. The pulse components are then mixed in a mixer circuit and applied to five output terminals, these corresponding to the arm, leg and chest electrodes normally used with electrocardiograph apparatus. An S wave is produced by a wave shaping network associated with the mixer circuit.

In accordance with an important feature of the invention there is provided a novel pulse or wave generating circuit for producing a pulse closely approximating the P, R or T portion of a cardiac waveform. Each pulse generator includes a normally conductive transistor coupled between an output terminal and a point of reference potential, and the transistor is controlled by a signal from a multivibrator and periodically is placed in a nonconductive condition. A restoring circuit gradually increases the operating bias of the transistor for returning the transistor to a conductive condition after a period of time. During this time, the potential of the output terminal is gradually increased to produce the leading edge of a generally triangular pulse. The restoring circuit then increases the conductivity of the transistor until it reaches its original level. During this time, the transistor serves to decrease the potential of the output terminal, thereby providing the trailing edge of the triangular pulse.

The pulse generating circuit of the present invention makes it possible to produce a pulse having a generally triangular shape and a rise time to fall time characteristic very much like the P, R and T pulses of a human cardiac waveform.

Many objects and advantages of the invention will appear from the following detailed description of an illustrative embodiment, and in conjunction with the description reference is made to the accompanying drawings, in which:

FIG. 1 is a schematic diagram illustrating cardiac wave simulating apparatus constructed in accordance with the invention;

FIG. 2 is a diagrammatic view of a cardiac waveform of a normal human subject;

FIG. 3 is a diagrammatic view of the output voltage characteristics of the main multivibrator of the apparatus of FIG. 1;

FIG. 4 is a diagrammatic view of the output voltage characteristics of the controlled multivibrator;

FIG. 5 is a diagrammatic view illustrating the control voltage at the base electrode of the P wave generator, and the P wave produced by the P wave generator;

FIG. 6 is a diagrammatic view illustrating the R wave produced by the R wave generator, and the R–S complex produced by the R–S pulse shaping circuit;

FIG. 7 is a diagrammatic view of the T wave produced by the T wave generator and the modified T wave produced by the T pulse shaping circuit; and FIG. 8 is a diagrammatic view of the output voltage characteristic taken from the RA and LL output terminals.

As discussed in greater detail in the above identified patent, modern electrocardiographs are designed for operation under the control of voltages developed between five patient electrodes applied to the arms, legs and chest of a patient, the right leg electrode customarily being grounded to the electrocardiograph chassis. The electrodes are connected to a selector switch associated with the electrocardiograph and the switch serves to select various input connections to the electrocardiograph amplifier circuitry. The selected, amplified signal is applied to recording apparatus for producing a record of the cardiograph waveform. The shape of the waveform depends upon the input combination selected by the selector switch.

In FIG. 2 there is diagrammatically illustrated a cardiac waveform recording 10 which might be produced by an electrocardiograph having input connections extended to the right arm and left leg of a human patient. Thus the waveform 10 comprises an amplified and recorded representation of the cardiac-induced voltage differential existing between the right arm and left leg of a human patient. The particular cardiac waveform illustrated is that of a normal horizontal heart having a slight clockwise rotation. Accordingly, the waveform includes a P wave followed by an R wave, a negative-going S wave and a T wave, the Q wave being absent or negligible in this particular normal heart type.

Referring now to FIG. 1 there is illustrated a cardiac waveform simulator 12 capable of providing a cardiac waveform complex very closely approximating the waveform complex produced by a normal human patient. The device 12 has five output terminals C, LL, LA, RA and RL corresponding respectively to the chest, left leg, left arm, right arm and right leg electrode connections made to a human patient. These output terminals are adapted to be connected in place of electrodes to the selector switch of an electrocardiograph for testing, demonstration and the like. When so connected, the resulting waveform complex is practically indistinguishable from the cardiac waveforms produced by a patient having a normal horizontal heart with slight clockwise rotation.

The cardiac waveform simulating device 12 includes a main or master multivibrator generally designated as 14 together with a controlled or slave multivibrator generally designated as 16. The main multivibrator 14 controls the rate of operation of the device 12 and also provides operating or control signals for a P wave generator generally designated as 18 and an R wave generator generally designated as 20. The controlled multivibrator 16 is synchronized with the main multivibrator 14 and provides an operating or control signal for a T wave generator generally designated as 22. The P, R and T waves are coupled through a mixer circuit generally designated as 24 to the output terminals, and a pair of pulse shaping networks 26 and 28 associated with the mixer circuit 24 modify the R wave to provide an R–S complex.

Energization of the device 12 is accomplished by means of a DC power supply illustrated as a battery 30 under the control of an on-off switch 32. The main multivibrator 14 is free-running, and operates whenever the switch 32 is closed. The multivibrator 14 includes a pair of common emitter transistors 34 and 36 having their collector electrodes coupled to the positive side of the power supply by means of load resistors 38 and 40. The transistor base electrodes are coupled to the power supply by a pair of base resistors 42 and 44, and a pair of capacitors 46 and 48 provide capacitive coupling to produce oscillating operation.

The output voltage characteristics of the multivibrator 14 are diagrammatically illustrated in FIG. 3, and as there appears, the operation of the multivibrator 14 is asymmetrical. The collector voltage characteristic of the transistor 34 is shown in full lines and designated as 50 while the collector voltage characteristic of the transistor 36 is shown in broken lines and designated as 52. At a time $t_1$ the transistor 34 is placed in a conductive condition and its collector voltage rapidly falls to a relatively negative value as indicated at 50a. At this time, the transistor 36 is rendered nonconductive and its collector voltage gradually rises to a relatively positive value. At a subsequent time $t_2$ the transistor 36 becomes conductive while the transistor 34 becomes nonconductive, and as a result the voltage characteristic 52 of transistor 36 drops rapidly to a relatively negative value as indicated at 52a.

As appears hereinafter, the negative-going signals 50a and 52a serve as operating signals or control signals for the P wave generator 18 and the R wave generator 20 respectively. For this purpose the output signals from the main multivibrator 14 are applied to the P and R generators by a pair of conductors 54 and 56.

The multivibrator 16 includes a pair of transistors 58 and 60, these transistors being connected in a common emitter configuration. The transistor collector and base electrodes are coupled to the relatively positive DC supply potential by a pair of load resistors 62 and 64 and a pair of base resistors 66 and 68, respectively. A pair of capacitors 70 and 72 are connected between the collector and base electrodes of the transistors 58 and 60 to produce an oscillating operation. The controlled multivibrator 16 is synchronized with the multivibrator 14 by a resistor 74 connected between the collectors of the transistors 36 and 58. The resistive coupling assures that transistors 36 and 58 become conductive at substantially the same time.

FIG. 4 illustrates the output voltage characteristics of the controlled multivibrator 16, the collector voltage characteristic of the transistor 58 being designated as 76 and the collector voltage characteristic of the transistor 60 being designated as 78. Due to the coupling provided by the resistor 74, at time $t_2$ when the transistor 36 becomes conductive the transistor 58 is also placed in a conductive condition. Thus the voltage characteristic 76 includes an abrupt negative-going portion 76a at time $t_2$. At this time the transistor 60 is placed in a nonconductive condition and its voltage characteristic begins to become more positive. At a subsequent time $t_3$ the multivibrator 16 reverts to its original state and transistor 60 again becomes conductive causing its collector voltage characteristic to abruptly drop as indicated at 78a. The negative-going signal 78a is applied by way of a conductor 80 to control the operation of the T wave generator 22.

Considering both FIGS. 3 and 4, it can be seen that through the use of a pair of synchronized, asymmetrical multivibrators it is possible to generate control or operating signals for the P, R and T generators 18, 20 and 22 at the desired time intervals for producing a simulated cardiac waveform. Thus the intervals between the times $t_1$, $t_2$ and $t_3$ are chosen in accordance with the intervals desired between generation of the P, R and T waves. It will of course be understood that since the multivibrator 14 is a free-running or astable type, the waves illustrated in FIGS. 3 and 4 are repeated on a regular, periodic basis as long as the switch 32 is closed to apply a DC supply to the circuit.

In accordance with an important feature of the present invention, there is provided a novel pulse or wave generating circuit for accurately simulating a P, R or T cardiac wave. This novel wave generating circuit is incorporated, with some variations, into the P, R and T generators 18, 20 and 22, and is capable of producing a substantially triangular shaped wave with any desired height, duration and rise time to fall time ratio. Thus the pulse generating circuit can be used to produce a pulse having substantially linear leading and trailing edges and having a rise time equal to or somewhat longer than the fall time, thereby to faithfully reproduce the type of wave induced by cardiac action.

Referring more specifically to the construction of the P wave generator 18, this generator is provided with a transistor 100 having emitter and collector electrodes connected to the positive and negative sides of the DC power supply by an emitter resistor 102 and a load resistor 104 respectively. The transistor 100 is normally maintained in a saturated, conductive condition by base current supplied via a base resistor 106.

The output of the P wave generator appears at an output terminal 108 and is coupled to the mixing circuit 24 by an output conductor 110. Referring to FIG. 5, the output voltage characteristic appearing at the terminal 108 is illustrated diagrammatically and is designated as a whole as 112. Normally the output terminal 108 is maintained at a level nearly equal to the chassis ground reference potential by the saturated, highly conductive transistor 100. The portion of the voltage characteristic during which the transistor 100 is in its saturated condition is designated as 112a in FIG. 5.

Each time an operating signal 50a is applied to the P wave generator 18 by the multivibrator 14, the generator 18 is effective to produce a P wave or pulse. Thus at time $t_1$, the negative-going control signal 50a is applied by the conductor 54 to the P wave generator 18. This negative-going signal is coupled through a capacitor 114 and a resistor 116 to the base electrode of the transistor 100, thus placing the transistor 100 abruptly in a nonconductive condition. Accordingly the transistor collector current is cut off and the potential of the output terminal 108 tends to rise.

Following the application of a negative-going control signal 50a, a restoring circuit including a resistor 106 begins gradually to change the charge condition of the capacitor 114, thereby gradually increasing the potential of the base electrode of transistor 100. Referring to FIG. 5, the voltage characteristic of the base electrode of the transistor 100, designated as 118, is shown in dotted lines and is superimposed over the P wave output characteristic 112 for purposes of illustration. At time $t_1$, when the negative-going control signal 50a is applied to the base electrode, the potential of the base electrode rapidly drops to a relatively negative value as illustrated at 118a. Thereafter, due to operation of the restoring circuit, the potential of the base electrode gradually increases as the charge condition of the capacitor 114 is charged, as indicated at 118b. At a time $t_{1a}$ this voltage reaches a level $v_1$ at which point the transistor 100 again begins to conduct. Thus this point corresponds to the threshold of conduction of the transistor 100. During the following period of time from the time $t_{1a}$ to a time $t_{1b}$, the action of the restoring circuit continues and the potential of the base electrode is gradually returned to the original, saturated level as indicated at 118c.

During the period of time from $t_1$ to $t_{1a}$ during which the transistor is being returned to a conductive condition, the output terminal 108 is coupled to the base electrode by a resistor 120 and a diode 122. Accordingly, during this period of time the potential of the output terminal 108 increases at substantially the same rate as the potential of the base electrode of transistor 100. This gradually increasing potential comprises the leading edge, designated as 112b, of the P wave.

During the subsequent period of time from $t_{1a}$ to $t_{1b}$, as the conductivity of the transistor 100 is gradually increased until it reaches a saturated conductive condition, the impedance of the path from the output terminal 108 to ground through the transistor 100 gradually decreases. Accordingly, the potential of the output terminal 108 is gradually decreased until it returns to its original level, this action producing the trailing edge of the P wave designated as 112c in FIG. 5.

In order to prevent any offset of the leading edge of the wave, the output terminal is coupled to ground by a resistor 124, and is coupled to the collector electrode of the transistor 100 by a diode 126. The diode prevents the potential of the output terminal from dropping below the steady state value at the beginning of the pulse.

The pulse generator 18 accordingly produces a generally triangular shaped pulse. The rise time and fall time may be made approximately equal or may be otherwise set as desired. The pulse height and duration can be set in order very closely to approximate a P wave of a cardiac waveform. More specifically, the values of the resistors 106 and 116 and the capacitor 114 determine the duration of the pulse. The value of the resistor 104 can be adjusted to provide the desired shape of the trailing edge of the pulse, which in the case of the P wave is substantially straight. The value of the resistor 102 determines the ratio of rise time to fall time. In addition, if it is desired to provide an offset at the beginning of the pulse, this can be accomplished by varying the value of the resistor 120. It will be apparent to those skilled in the art that due to the interaction of the elements of the circuit, other methods may be used to vary the pulse shape, etc.

As noted above, the R and T wave generators 20 and 22 are variations of the basic circuit used in the P wave generator 18, the values of the various circuit elements being chosen to provide the particular pulse shape, height and duration for simulating the R and T waves respectively. Since the R and T wave generators operate in the same manner as the P wave generator described above, a detailed description of their operation is not necessary. The circuit elements of the R wave generator 20 and T wave generator 22 are provided with reference numerals corresponding to those used to designate the circuit elements of the P wave generator 18, except that they are increased by 100 and 200 respectively.

The output voltage characteristic of the R wave generator 20 appearing at the output terminal 208 is diagrammatically illustrated in full lines in FIG. 6, and is designated as 212. In the normal condition, the saturated, conductive transistor 200 holds the output voltage at a potential near ground potential, as illustrated at 212a. At time $t_2$ when an operating signal 52a is received from the main multivibrator 14, the R wave generator produces a triangular shaped pulse having a leading edge 212b, and a trailing edge 212c.

The output voltage characteristic of the T wave generator 22 appearing at the output terminal 308 is coupled through a pulse shaping, integrating circuit generally designated as 330 to the output conductor 310 more accurately to simulate a naturally occurring T wave. The voltage characteristic which would exist at terminal 308 absent the integrating circuit 330 is illustrated in full lines in FIG. 7 and is designated 312. In the normal condition the saturated, conductive transistor 300 maintains the output voltage at a near-ground potential as illustrated at 312a. At time $t_3$, when an operating signal 78a is received from the controlled multivibrator 16, the T wave generator produces a triangular shaped pulse having a leading edge 312b and a trailing edge 312c.

A more realistic T wave is produced by modifying the triangular shape of the wave with the integrating circuit 330, including a resistor 332 and a capacitor 334. The modified smoothed wave applied by the output conductor 310 to the mixing circuit 24 is illustrated in broken lines in FIG. 7 and designated as 312'.

The mixing circuit 24 serves to apply the P, R and T waves to the output terminals in such a way that a voltage wave form complex closely approximating a voltage complex induced by cardiac action is produced. This requires the P and T waves to appear at terminals C, LL, and LA, and the R wave to appear at the terminal LA. In addition, an R–S complex should appear at the terminals LL and LA. Since a normal human heart with slight clockwise rotation is simulated, there is no requirement for a Q wave. The RL output terminal is connected to ground, and since the voltage differential existing between the right leg and right arm of a human subject is slight, the RA terminal is coupled to the RL terminal by a resistor 400.

The P wave produced by the P wave generator 18 is applied to the C, LL, and LA terminals by a series of voltage dividing circuits including the resistors 402 and 404, 406 and 408, and 410 and 412. The values of the resistances are chosen so that a small P wave appears at terminal C, and somewhat larger waves appear at terminals LL and LA.

The R wave produced by the R wave generator 20 is applied via the output conductor 210 and coupled through a resistor 414 to the LA terminal. There is no S wave appearing at the terminal LA.

In order to modify the R wave and produce an R–S complex appearing at the LL and C terminals, the pulse shaping networks 26 and 28 are provided. The network 26 includes a capacitor 416 in series with a resistor 418, both in parallel with a resistor 420. The network 26, together with the resistor 224, produces a differentiating action modifying the R wave to produce a negative-going S wave at its trailing edge. The R–S complex produced by the network 26 and applied to the terminal LL is illustrated in broken lines in FIG. 6 and is designated as 212′.

The network 28 also performs a differentiating function, and includes a capacitor 422 in series with a resistor 424. This network produces a smaller R wave and larger S wave than the wave complex 212′ produced by the network 26.

The T wave 312′ produced by the T wave generator 22 and appearing on the output conductor 310 is coupled to the C, LL and LA terminals by resistors 426, 428 and 430 respectively. The values of the resistors are chosen so that pronounced T waves appear at the terminals LL and C, and a smaller T wave appears at the terminal LA.

Referring now to FIG. 8, there is diagrammatically illustrated the voltage waveform, designated as 432, comprising the voltage differential across the output terminals RA and LL. It can be seen that the mixing circuit 24 produces a combination of the P, R, S and T waves closely approximating a human cardiac waveform of the type illustrated in FIG. 2. The waves are very similar to the naturally occurring waves, both in shape and in rise time to fall time characteristics. Accordingly, the simulated cardiac waveform produced by the device 12 is highly satisfactory for testing and demonstrating electrocardiograph equipment.

It should be appreciated that the various voltage characteristics diagrammatically shown in FIGS. 3–8 are qualitative rather than quantitative in nature, and are included for purposes of illustration only. Thus, the scale and other characteristics of the waveforms are altered for purposes of illustration and clarity.

In a device constructed in accordance with the present invention, components having values listed in the following table were found to produce excellent results. These values are given by way of illustration of one embodiment of the invention only, and their inclusion here is not intended to limit the invention, which is defined in the claims appended to the specification. In the following table the semiconductor devices are identified by their numerical type designations, the values of the resistors are in ohms, and the values of the capacitors are in microfarads.

Power supply, transistors and diodes:

| | |
|---|---|
| 30 _____volt__ | [1]1.5 |
| 34, 36, 58, 60 _____ | 2N3394 |
| 100, 200, 300 _____ | 2N1304 |
| 122, 126, 322, 226, 326 _____ | 1N456 |
| 222 _____ | [2]1N90–1N456 |

Resistors:

| | |
|---|---|
| 38 _____ | 10K |
| 40, 64, 120, 204, 320 _____ | 4.7K |
| 42 _____ | 68K |
| 44, 62 _____ | 22K |
| 66 _____ | 200K |
| 68 _____ | 43K |
| 74 _____ | 27K |
| 102, 116 _____ | 1K |
| 104, 304 _____ | 13K |
| 106 _____ | 24K |
| 124, 224, 324 _____ | 51K |
| 202, 302 _____ | 390 |
| 206 _____ | 33K |
| 220 _____ | 1.5K |
| 306 _____ | 62K |
| 332 _____ | 680K |
| 400, 412 _____ | 2K |
| 402 _____ | 12M |
| 404 _____ | 5.1K |
| 406, 410 _____ | 8.2M |
| 408 _____ | 3K |
| 414 _____ | 1.3M |
| 418 _____ | 2M |
| 420 _____ | 1.5M |
| 424 _____ | 470K |
| 426 _____ | 390K |
| 428 _____ | 560K |
| 430 _____ | 1M |

Capacitors:

| | |
|---|---|
| 46, 48, 72, 114 _____ | 10 |
| 70 _____ | 3.3 |
| 214 _____ | 6.8 |
| 314 _____ | [3]10 |
| 334 _____ | .1 |
| 416 _____ | .0047 |
| 422 _____ | .01 |

[1] AA cell.
[2] Series connected.
[3] Two, parallel connected.

A circuit constructed in accordance with the invention and using components having the values set forth in the above table was found to perform in a very satisfactory manner. The output voltage complex is very difficult to distinguish from a normal human heart. In addition the device has a low power consumption of 1.5 milliwatts, and a low voltage requirement of 1.1 to 1.5 volts. It has been found that such a device operates for more than 900 hours on a small AA cell.

While the present invention has been described in connection with a particular embodiment thereof, various other modifications and embodiments may be devised by those skilled in the art. The present invention is not limited to details of the described embodiment, except insofar as set forth in the following claims.

What is claimed as new and desired to be secured by Letters Patent of the United States is:

1. Apparatus for simulating a generally triangular pulse such as one of the P, R and T pulses of a cardiac wave form, said apparatus comprising an output terminal, a controlled conduction device coupled between said output terminal and a point of reference potential, means normally biasing said device to a given conductive condition, a control circuit for placing said device in a nonconductive condition, a restoring circuit gradually increasing the operating bias of said device for returning the device to its threshold of conduction during a first time period and for gradually increasing the conductivity of the device until it returns to said given conductive condition during a second time period, and circuit means coupled between said restoring circuit and said output terminal and controlled by said restoring circuit for gradually increasing the potential of said output terminal during said first time period to produce the leading edge of the triangular pulse, said device upon becoming increasingly conductive being effective to decrease the potential of said output terminal to produce the trailing edge of the triangular pulse during the second time period.

2. The apparatus of claim 1, said controlled conduction device comprising a transistor having a collector electrode coupled to said output terminal, and an emitter electrode coupled to said point of reference potential.

3. The apparatus of claim 2, said control circuit including a signal source for providing periodic negative-going operating signals, said transistor having a base electrode, and a capacitor coupled between said source and said base electrode for placing said transistor in a nonconductive condition upon receipt of each operating signal.

4. The apparatus of claim 3, said restoring circuit including resistive means connected to said capacitor for gradually changing the charge condition of said capacitor to increase the operating bias applied to said base electrode.

5. The apparatus of claim 4, said circuit means including rectifying means coupled between said base electrode and said collector electrode for increasing the potential of said collector electrode upon an increase in the operating bias of said base electrode.

6. The apparatus of claim 1 wherein said second potential is positive with respect to said first potential, and a diode having an anode connected to said variable conductivity device and having a cathode connected to said output terminal for preventing the potential of said output terminal from decreasing below said first potential.

7. A voltage pulse generator for producing a generally triangular pulse in response to the application of a step control signal from a signal source, said generator comprising a controlled conduction device having a pair of output electrodes and a control electrode, means normally biasing said device to a conductive condition, an output terminal, means coupling said output terminal through said output electrodes to a point of reference potential for normally holding said output terminal at a first potential corresponding to said reference potential, a capacitor coupled between the signal source and said control electrode for applying the step control signal to said control electrode to place said device in a nonconductive condition, a restoring circuit for gradually changing the charge condition of said capacitor for returning said device to a conductive condition after a predetermined time, and circuit means coupled between said output terminal and said capacitor for gradually changing the potential of said output terminal to a second potential in accordance with the gradual change in the charge condition of said capacitor during said predetermined time, said device upon becoming conductive being effective to return the potential of said output terminal to said first potential.

8. The voltage pulse generator of claim 7, said controlled conduction device comprising a transistor.

9. Apparatus for simulating the R and S pulses of a cardiac waveform comprising: a circuit node, a normally conductive transistor coupling said node to a point of reference potential, a periodically operable control circuit for placing said transistor in a nonconductive condition for a time period of predetermined duration at regular intervals, a restoring circuit for gradually returning the transistor to its original level of conduction following each time period, means coupled between said restoring circuit and said node and controlled by said restoring circuit for increasing the potential of said node to produce the leading edge of a triangular pulse during each time period, said transistor upon returning to its conductive condition being effective to decrease the potential of said node to produce the trailing edge of the triangular pulse following each time period, and a differentiating circuit receiving the triangular pulses from said node for shaping the triangular pulses into sequential R and S pulses.

10. Apparatus for simulating the T pulse of a cardiac waveform comprising: a circuit node, a normally conductive transistor coupling said node to a point of reference potential, a periodically operable control circuit for placing said transistor in a nonconductive condition for a time period of predetermined duration at regular intervals, a restoring circuit for gradually returning the transistor to its original level of conduction following each time period, means coupled between said restoring circuit and said node and controlled by said restoring circuit for increasing the potential of said node to produce the leading edge of a triangular pulse during each time period, said transistor upon returning to its conductive condition being effective to decrease the potential of said node to produce the trailing edge of the triangular pulse following each time period, and an integrating circuit receiving the triangular pulses from said node for shaping the triangular pulses into T pulses.

11. In apparatus for simulating a cardiac waveform the combination comprising:
  multivibrator means for producing first, second and third control signals at predetermined intervals;
  P, R and T wave generators connected to said multivibrator means and operable respectively in response to said first, second and third control signals to produce generally triangular pulses;
  and mixing means for combining said pulses into a composite waveform;
  each said generator including an output terminal coupled to said mixing means;
  a normally conductive transistor coupling said terminal to a point of reference potential for maintaining the potential of said terminal at a first level;
  means connected between said multivibrator means and said transistor for placing said transistor in a nonconductive condition in response to the corresponding control signal;
  restoring means for returning said transistor to its threshold of conduction during a first period of time, and for returning the conductivity of said transistor to its original level during a second period of time;
  and circuit means coupled between said restoring means and said terminal and controlled by said restoring means for gradually increasing the potential of said terminal during said first period of time to produce the leading edge of the triangular pulse;
  said transistor during said second period of time being effective to return the potential of said terminal to said first level to produce the trailing edge of the triangular pulse.

12. The combination of claim 11 further comprising a differentiating network connected to the output terminal of said R wave generator for transforming said triangular pulse into sequential R and S pulses.

13. The combination of claim 12 further comprising an integrating network connected to the output terminal of said T generator for smoothing said triangular pulse.

References Cited

UNITED STATES PATENTS

| 3,316,491 | 4/1967 | Berman et al. | 307—268 X |
| 3,323,068 | 5/1967 | Woods | 328—127 X |
| 3,007,055 | 10/1961 | Herzfeld | 307—228 |
| 3,150,272 | 9/1964 | Gard | 307—228 |

JOHN S. HEYMAN, Primary Examiner

U.S. Cl. X.R.

307—228